April 30, 1963  E. C. McMURRAY ETAL  3,087,340
VEHICLE SPEED WARNING AND CRUISE CONTROL SYSTEM
Filed Sept. 11, 1961  7 Sheets-Sheet 1

INVENTORS
Eugene C. McMurray &
Henry H. Harada
BY
ATTORNEY

April 30, 1963 E. C. McMURRAY ETAL 3,087,340
VEHICLE SPEED WARNING AND CRUISE CONTROL SYSTEM
Filed Sept. 11, 1961 7 Sheets-Sheet 3

INVENTORS
Eugene C. McMurray &
Henry H. Harada
BY
ATTORNEY

April 30, 1963  E. C. McMURRAY ETAL  3,087,340
VEHICLE SPEED WARNING AND CRUISE CONTROL SYSTEM
Filed Sept. 11, 1961  7 Sheets-Sheet 6

INVENTORS
BY Eugene C. McMurray &
Henry H. Harada
ATTORNEY

INVENTORS
Eugene C. McMurray &
Henry H. Harada
BY
D. D. McGraw
ATTORNEY

United States Patent Office 3,087,340
Patented Apr. 30, 1963

3,087,340
VEHICLE SPEED WARNING AND CRUISE
CONTROL SYSTEM
Eugene C. McMurray, Flint, and Henry H. Harada, Grand Blanc, Mich., assignors to General Motors Corporation, Detroit, Mich., a corporation of Delaware
Filed Sept. 11, 1961, Ser. No. 137,423
12 Claims. (Cl. 73—506)

This application is a continuation-in-part of the United States patent application Serial No. 67,820, entitled "Vehicle Speed Warning and Cruise Control System," filed November 7, 1960, in the name of John B. Brennan, John B. Force, Eugene C. McMurray, John A. McDougal and Henry H. Harada. The disclosure of that application is, therefore, incorporated herein by reference as if it were fully reproduced herein.

The invention relates to control mechanisms for automotive vehicles and particularly to speed transducers for use in mechanisms which provide a warning to the vehicle operator when a predetermined vehicle speed is reached in one mode of operation, and in another mode of operation maintains the vehicle at a predetermined road speed under varying load conditions. Devices of this nature are sometimes referred to as vehicle cruise controls and several devices of this nature have been offered at various times in the automotive accessory market.

The speed transducers or error detectors have two input values. One input is the set or command speed which the driver adjusts on the set knob. The other input to the speed transducer is vehicle speed. The speed transducer compares actual speed to the set or command speed and determines the differences between the two to provide an error signal. This signal is sent to an amplifier, the output of which is used to control the fluid pressure servomotor which is in turn connected to control the engine of the vehicle in such a sense as to reduce the error signal to zero and to maintain it as close to zero as possible. The continuous sensing of vehicle speed and the provision of a continuous error signal system keep the error signal very close to zero so that the vehicle travels at almost exactly the set or command speed.

The speed control system illustrated in FIGURE 1 and having a speed transducer embodying the invention is in the condition of operation wherein the vehicle is traveling at a road speed below the cruise-set speed. The usual accelerator pedal 20 is connected to a throttle rod 22 for control of an engine throttle in the well known manner. A throttle return spring 24 is suitably attached to the throttle linkage of which rod 22 is a part and urges the engine throttle toward the zero throttle position. A transfer bracket 26 is secured to the rod 22 to provide a connecting joint for the control. A control operating lever 28 is pivotally connected to the transfer bracket 26 by its forked end 30 and the pivot pin 32. Lever 28 is also attached by a pivot 34 to a bracket 36 suitably attached to a portion of the engine or vehicle engine compartment by mounting bracket 38. A pin 40 extends through lever 42 and receives a servo rod 44. Lever 42 is also pivotally secured to pivot pin 34 and is normally movable with lever 28 by means of the throttle block override spring 46 and tab 47. When necessary during operation of the vehicle, lever 28 may be moved against the force of spring 46 relative to lever 42 so as to disengage tab 47 from lever 28 and permit operation of the engine throttle to override the throttle block condition.

A servo assembly 48 includes a housing 50 divided by a flexible diaphragm 52 into a throttle block chamber 54 and a cruise chamber 56. The servo assembly 48 is mounted to a stationary portion of the vehicle and in suitable alignment with other portions of the system. Servo rod 44 extends through chamber 56 and one side of housing 50 through a seal 58 and is attached to flexible diaphragm 52 and movable therewith. A conduit 60 connects cruise chamber 56 to the cruise engaging valve assembly 62. A branch conduit 64 from conduit 60 may have an air filter 66 therein and terminate at a vent 68 controlled by a normally closed valve 70. This valve may be operated by the vehicle transmission selector mechanism so that vent 68 is closed only when the transmission is in the drive position and under all other conditions is open to vent conduit 60 and, therefore, chamber 56 to atmosphere. Another branch conduit 72 is connected with conduit 60 and provided with an air filter 74 and terminating at the vent 76. Normally closed valve 78 controls vent 76 and is connected to the brake actuating arm 80 so that vent 76 is open whenever the vehicle operator depresses brake pedal 82 against the brake pedal return spring 84. Spring 84 will normally act to keep valve 78 in the vent-closed position. The cruise engaging valve assembly 62 includes a housing 86 which may be the existing vehicle turn signal arm modified to receive the internal components of the assembly. Conduit 60 is connected with the inner passage 88 at one end of that passage. The other end of passage 88 is occupied by the cruise set button 92 which is biased outwardly by spring 96 so that inner passage 88 is vented to the atmosphere through vent 98 when the button is in its outer position. A seat seal 100 may be engaged by the head of button 92 so that passage 88 is closed at the button and when the cruise condition of the control is set. A valve rod 102 is secured to the button 92 and has a valve 104 on the end opposite the button for controlling the admission of engine vacuum to conduit 60 through vacuum conduit 106. A valve seat 108 is provided in the end of conduit 106 which extends into housing 86 and is positioned so that the end of conduit 106 is closed when button 92 approaches the outer end of passage 88, and is open when button 92 engages seat seal 100. Vacuum conduit 106 is connected through a conduit 109 to engine vacuum from the engine intake manifold or any other suitable vacuum source 111. Vacuum may thus be supplied to cruise chamber 56 through conduit 60 and enter passage 88 from conduit 106 when valve 104 is opened. The differential pressure in passage 88 as compared to atmospheric pressure will hold button 92 against seat seal 100 until atmospheric pressure is again admitted to conduit 60 and chamber 88. Spring 96 is of an appropriate size and strength in relation to the area of button 92 and the force of engine vacuum to accomplish this result. However, spring 96 is sufficiently strong to hold valve 104 against seat 108 when vent 98 opens passage 88 to the atmosphere.

Throttle block chamber 54 is connected by conduit 110 to the speed control valve assembly 112. This assembly includes a housing 114 defining a chamber 116 which is connected to conduit 110, the vacuum supply conduit 109 and the atmospheric air supply conduit 118. An air filter 120 may be provided in conduit 118 to filter atmospheric air which may enter chamber 116. A valve unit 122 is pivotally supported at 124 in chamber 116 and is provided with valve seats 126 and 128 on opposite sides of pivot 124 which are in sealable alignment with the ends 130 and 132 of conduits 109 and 118, respectively. Valve seat 126 can open and close conduit end 130 while valve seat 128 is closing and opening atmospheric conduit end 132. An armature 134 is attached to valve unit 122 and is aligned with the electromagnet core 136 which also extends into chamber 116. Tension spring 138 is attached to valve unit 122 and urges armature 134 away from core 136. Core 136 may be magnetically energized by the electromagnet coil 40 of the electromagnetic assembly 142 in a manner to be described. When core 136 is magnetically energized, valve unit 122 pivots counterclockwise by magnetic attraction of armature 134 so that air supply conduit 118 is closed by valve seat 128 and vacuum conduit 109 is opened to chamber 116. When core 136 is deenergized, spring 138 pivots valve unit 122 clockwise so that valve seat 126 closes vacuum supply conduit 109 and valve seat 128 opens atmospheric air supply conduit to chamber 116. If desired, valve seats 126 and 128 may be on the same side of pivot 124, with conduit ends 130 and 132 being disposed on opposite sides of arm 122 to obtain the same effect.

The electrical portion of the control system is provided to energize the electromagnet coil 140 in the proper proportion of time so that desired control of the vehicle engine speed is obtained. Coil 140 is connected through lead 144 through the ignition switch 146 to the positive side of the vehicle electrical system, illustrated diagrammatically as the electrical source 147. Electrical lead 148 is connected to the other end of coil 140 and through the electronic transistor type amplifier 150 and lead 152 to ground. The amplifier 150 is an on-off switch-type amplifier for which the contact signal is attained by an electrical circuit 154 having a low current. Circuit 154 has resistors 156 and 158 therein as well as the speed sensing unit 160 which may be a part of the vehicle speedometer unit or an independent assembly. Lead 162 of circuit 154 contains resistor 158 and connects through lead 164 to amplifier 150 and also to the unit 160. Lead 166 connects resistor 156 to lead 164 and lead 167 connects resistor 156 through the ignition switch 146 to the positive side of the vehicle electrical system. Lead 168 connects the speed sensing unit 160 to ground.

Figure 2:
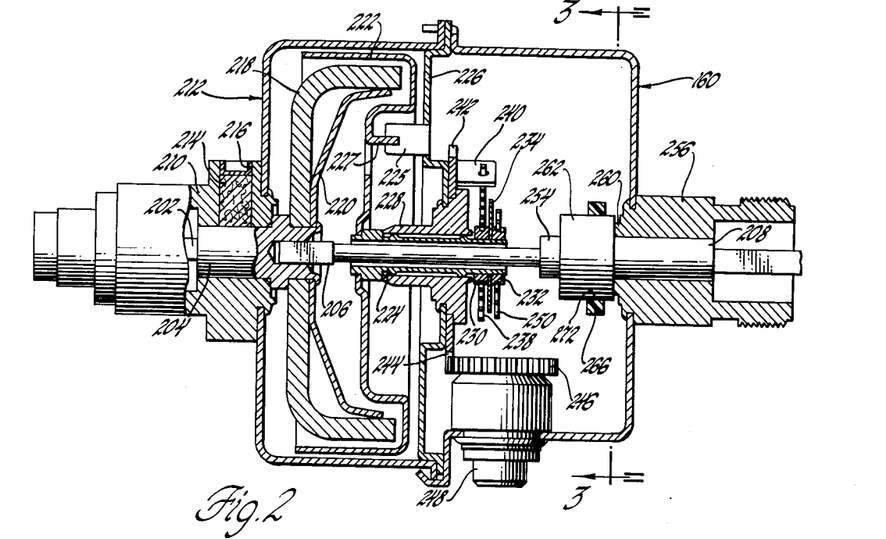
FIGURE 2 is a view of a speed transducer assembly embodying the invention which may be used in the system of FIGURE 1, with parts broken away and in section.
Figure 3:
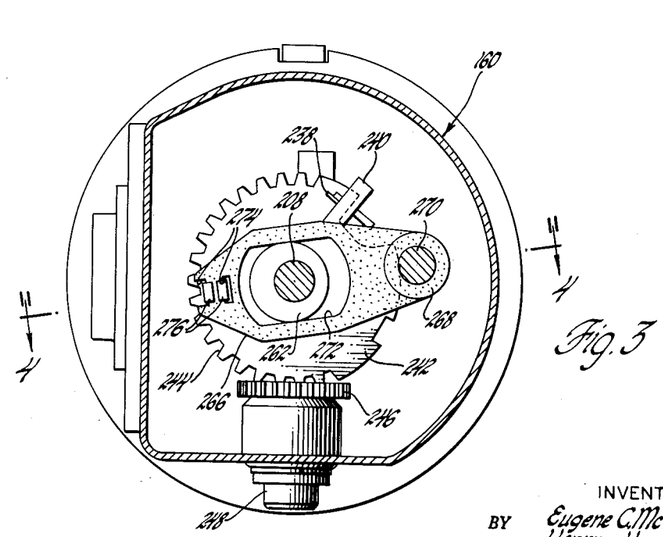
FIGURE 3 is a cross-section view of the speed transducer of FIGURE 2 taken in the direction of arrows 3—3 of that figure.
Figure 4:
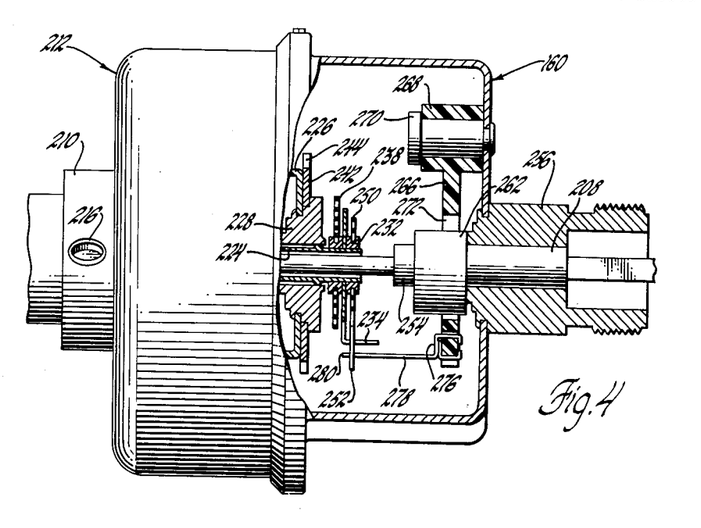
FIGURE 4 is a partial section view of the speed transducer of FIGURE 3 as taken in the direction of arrows 4—4 of that figure.

FIGURES 2, 3 and 4 illustrate a speed transducer unit 160 embodying the invention and which is best adapted for installation in vehicles having existing speedometers and may be installed at any suitable position in the speedometer drive line. For convenience, however, it is preferably installed adjacent the speedometer. The speedometer drive cable is attached to the unit 160 at 202 and drives magnet drive shaft 204. A shaft 206 is journaled in the inner end of shaft 204 and extends through the speed transducer unit 160 and is connected with the speedometer drive 208 which may drive the vehicle speedometer. Shaft 204 rotates in bearing 210 received in one end of housing 212. This bearing may be suitably lubricated by wick 214 which is contained in a radially extending passage in bearing 210 and sealed by cap 216. A magnet 218 and a temperature compensating element 220 are secured to the inner end of shaft 204 and rotatable therewith. A speed cup 222 is mounted on a hollow shaft 224 received concentrically about a part of shaft 206 but radially spaced therefrom. A field plate 226 is mounted in housing 212 and extends transversely of the axis of the shaft 206. A stop tab 225 is struck out of plate 226 and is engageable with a cooperating tab 227 struck out of speed cup 222 to prevent the speed cup from rotating beyond the maximum speed at which control may be desirable so as to protect the elements associated therewith from damage if such speeds are attained. Tab 227 is shown rotated out of position in FIGURE 2 to indicate this engaging action. A bearing 228 is received in field plate 226 for supporting speed cup shaft 224. Shaft 224 extends through and beyond bearing 228 and has a speed hairspring mounting collar 230, a contact hairspring collar 232 and a contact hairspring pickup arm 234 mounted thereon so that they rotate as the speed cup 222 is rotated by action of the rotating magnet 218. A speed hairspring 238 is torsionally wound and has its inner end secured to collar 230 and its outer end secured to the speed hairspring holding tab 240 formed on the hairspring regulator 242. Regulator 242 has a geared section 244 and is so mounted on bearing 228 as to be rotatable thereabout to pre-tension spring 238. This rotation is accomplished by meshing gear 246 and a suitable manual drive 248 which may be rotated by the vehicle operator to set the desired unit command speed. A contact hairspring 250 has its inner end secured to collar 232 and is torsionally wound so that its outer end 252 is biased against arm 234.

A retaining end drive collet 254 is secured in drive relationship with shaft 206 adjacent arm 234. A bushing 256 is secured in the other end of housing 212 from bearing 210 to which the sheath of the speedometer drive 208 may be attached. Bushing 256 has a quill section 260 extending inwardly toward collet 254 and radially spaced from shaft 206. An eccentric cam 262 is pivotally mounted on quill section 260 and is drivingly engaged with collet 254 so as to be driven as shaft 206 rotates.

Cam follower arm 266 is journaled at one end 268 about a pin 270 which is attached to the end of housing 212 containing bushing 256. Arm 266 has a slot 272 formed therein in which eccentric cam 262 is received so that as the cam is rotated arm 266 is pivoted about pin 270. Arm 266, therefore, has one oscillating cycle per revolution of the speedometer drive when eccentric cam 262 is formed as illustrated. It may be formed so as to provide more cycles per revolution if desired. Arm 266 has recesses 274 in the end extending opposite journal 268 in which a part 276 of an oscillator arm 278 is received. Oscillator contact arm 278 has an extending end 280 which normally engages the outer end 252 of contact hairspring 250 and cooperates therewith to provide a set of make-and-break contacts. Therefore, as the unit is being driven, the outer contact spring end 252 is oscillated, for example, through an arc equivalent to 10 miles per hour vehicle speed. As contact pick-up arm 234 is rotated in accordance with increasing vehicle speed, it contacts hairspring end 252 for a greater or lesser portion of the oscillating cycle to break electrical contact between hairspring 250 and contact end 280. Hairspring 250 is electrically grounded through speed cup shaft 224. Contact arm 278 with its end 280 is insulated from ground with the electrical connection for lead 162 of FIGURE 1 being made thereto through suitable wiring.

When the vehicle is traveling under its own power but well below the set speed for either speed warning or cruise modes, the system is in the condition shown in FIGURE 1. The cruise button 92 is in its outer position and air at atmospheric pressure is contained in conduit 60 and cruise chamber 56. The vehicle speed is considerably less than the speed at which regulator 242 is set. The end 252 of contact spring 250, therefore, does not at any time engage contact 280 to complete the electrical circuit 154. Electromagnet core 136 is thus deenergized at all times and valve unit 122 is positioned so that air under atmospheric pressure is admitted through conduit 118, chamber 116 and conduit 110 to the throttle block chamber 54. Diaphragm 52 is exposed to atmospheric pressure on both sides and there is no fluid force tending to move lever 28 in either direction. The throttle linkage 22 may, therefore, be moved to any desired position by manipulation of the accelerator pedal 20 without encountering resistance due to fluid forces in the control system. As the throttle linkage 22 is moved toward the open and closed throttle positions, lever 28, rod 44 and diaphragm 52 will follow its movement. Engine vacuum imposed in conduits 106 and 109 terminates at valve seats 108 and 126 since the conduits are closed by these seats.

When the vehicle speed increases to such a value that contact spring end 252 enters the oscillation zone, or proportional control zone of contact 280, spring end 252 begins engaging the contact 280 at the low speed end of its oscillating stroke. Contacts 252 and 280 are, therefore, closed, first for a very small percentage of oscillation cycle and then for a greater percentage of that cycle as the vehicle speed increases and moves spring contact end 252 nearer the center of mean position of the oscillation zone of contact 280. The larger the percentage of the oscillation cycle time that contact 252 is in engagement with contact 280, the greater percentage of the time is electromagnet core 136 magnetically energized and, therefore, the greater percentage of time is vacuum admitted into chamber 116 of the speed control valve assembly 112, and the lesser percentage of time is air at atmospheric pressure admitted to chamber 116 through conduit 118. An air pressure is, therefore, obtained in chamber 116 which may be considered to be a mixture of vacuum and atmospheric air, the absolute pressure of which is determined by the percentage of the oscillation cycle in which electromagnet core 136 is energized. This mixture may be referred to as the cycling pressure or control pressure and is imposed on diaphragm 52 through conduit 110 and throttle block chamber 54. The cycling pressure is a net result reflected as a decrease in absolute pressure in chambers 116 and 54 which urges diaphragm 52 to the right under influence of greater pressure in chamber 56. A force is, therefore, exerted by the servo 48 on the operating lever 28 through rod 44, lever 42 and stop 47 which tends to move throttle linkage 22 toward the closed throttle position and appears as a back pressure on the accelerator pedal 20. This pressure is sufficient to provide a throttle block feel to the operator. If the operator continues to hold the accelerator pedal down so that the vehicle accelerates further, contact 252 will engage contact 280 a greater percentage of time and, therefore, a greater vacuum will be impressed in chamber 54 and a greater back pressure will be felt against the accelerator pedal. When the vehicle operator so desires, he may press accelerator pedal 20 downward against the back pressure so as to increase throttle opening and vehicle speed even though diaphragm 52 is moved to the right. This is accomplished by the lost relative motion arrangement including levers 28 and 42, stop 47 and spring 46.

Reference is made to the above-noted patent application wherein the operation of the system, when in the cruise mode with the vehicle traveling at the set road speed, is described in detail. It is sufficient to note herein that when the set road speed is attained, contacts 252 and 280 will control electromagnet 140 and valve unit 122 so that the valve unit is oscillating at the same frequency as contact 280 and a sufficiently low cycling pressure is maintained in throttle block chamber 54 to balance diaphragm 52 so that the throttle rod 22 is positioned to maintain the set speed.

When the vehicle speed tends to overrun the set cruise speed, such as when it is on a downgrade, for example, the control unit will allow the throttle return spring to move the engine throttle toward the closed position to decrease the power delivered by the engine and counteract the tendency to overrun the set speed. The unit will tend to accomplish the same result when the vehicle operator has pressed the accelerator pedal downwardly to temporarily accelerate above the set cruise speed for any reason. Contacts 252 and 280 will be closed a greater percentage of the oscillating cycle of contact 280 and, assuming the range of contact oscillation to be equivalent to a 10 m.p.h. vehicle speed range, if the vehicle is accelerated 5 m.p.h. over the set speed, these contacts will be closed at all times. The atmospheric air conduit 118 will be closed a corresponding percentage of the cycle time by valve seat 128 and may be closed all of the time. The vacuum conduit 109 will then be connected without interruption to the throttle block chamber 54. This will allow the throttle return spring to cause diaphragm 52 to move to the right, thereby closing or tending to close the engine throttle to decrease speed. Therefore, at the extreme condition, engine vacuum will be in conduits 60, 106, 109 and 110 and chambers 116, 54 and 56.

If the vehicle brakes are applied while the vehicle is cruising under influence of the control unit at the set cruise speed, valve 78 will be unseated and vent 76 will be opened thereby venting conduits 72 and 60 and cruise chamber 56 to atmosphere. The cycling pressure in throttle block chamber 54 will remain since the vehicle speed has momentarily remained the same. The absolute pressure in chamber 54 may then momentarily increase as the vehicle speed drops due to brake action. The atmospheric pressure in chamber 56 entering through vent 76 will move diaphragm 52 to the right and this motion will be transmitted to throttle rod 22 to close the engine throttle. Since atmospheric pressure is also admitted to passage 88 of the valve assembly 62, there will be insufficient differential pressure acting on button 92 to hold it against seat seal 100 and compression spring 96 will move the button to its outer position until valve 104 engages seat 108. Conduit 60 will then be vented to atmosphere through vent 98 and passage 88 and will remain vented to atmosphere even though the brake pedal is released and valve 78 again closes vent 76. The unit will then be in the condition illustrated in FIGURE 1 and described above.

Figures 5, 6, 7, 8:
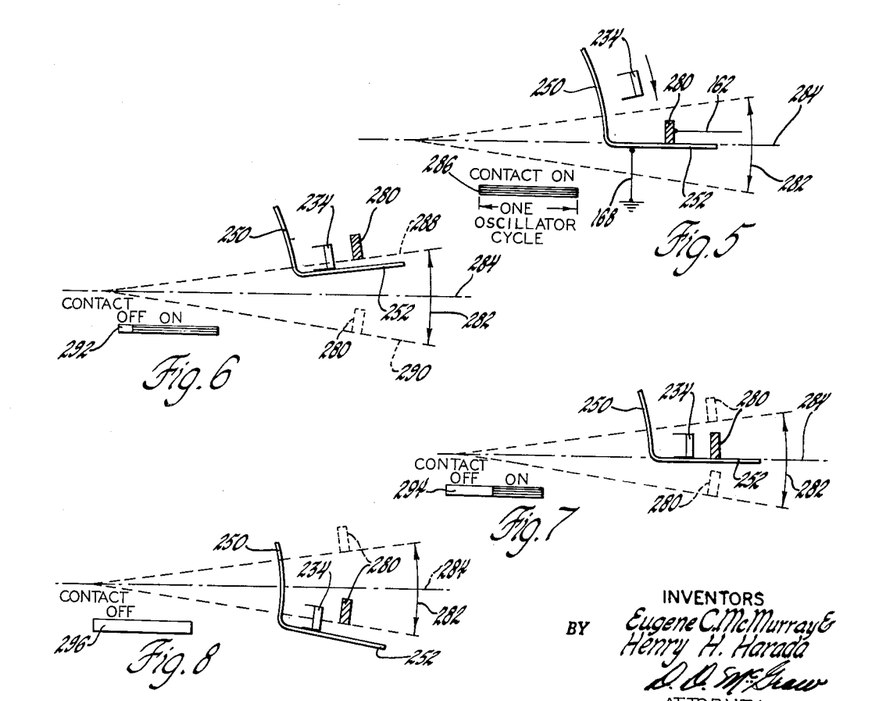
FIGURE 5 is a diagrammatic illustration of the operation of the contact spring, contact pin and lifting pin of the speed transducer when the vehicle speed is below the proportional control zone.
FIGURE 6 is a diagrammatic illustration of the operation of the contact spring, contact pin and lifting pin of the speed transducer when the vehicle speed is within the low side of the proportional control zone.
FIGURE 7 is a diagrammatic illustration of the operation of the contact spring, contact pin and lifting pin of the speed transducer when the vehicle speed is at the set desired speed.
FIGURE 8 is a diagrammatic illustration of the operation of the contact spring, contact pin and lifting pin of the speed transducer when the vehicle speed is above the proportional control zone.

FIGURES 5–8 illustrate various stages of operation of the speed transducer assembly as the vehicle speed increases from a value below the proportional control zone to a value above the proportional control zone. The proportional control zone is indicated by the arcuate arrow 282 and extends equally on each side of the line 284 which indicates the mean position of the end 280 of oscillator arm 278. This zone may be equivalent to ten m.p.h. vehicle speed, with five m.p.h. being on each side of the set desired speed. Referring to FIGURE 5, as oscillator arm 278 oscillates, the edge of end 280 which is in contact with the hairspring outer end 252 moves through the proportional control zone range and carries spring end 252 with it throughout this range due to the torsional tension of spring 250. Since the arm 234 is not within the proportional control zone, it does not contact spring end 252 at any time and the switch defined by ends 252 and 280 is closed throughout the entire oscillator cycle as indicated by the graph 286.

As the vehicle speed increases, arm 234 moves into the low side of the proportional control zone as indicated in FIGURE 6. The oscillating movement of arm end 280 to the low edge 288 of the zone permits spring end 252 to be lifted off end 280 as it engages arm 234. As end 280 moves toward the high edge 290 of the proportional control zone, it again engages end 252 of the spring and closes the contacts. This action is illustrated in graph 292.

When the vehicle speed has increased so that arm 234 is at the mean position 284 of the proportional control zone, the spring end 252 engages the end 280 only during the upper half of the zone and is lifted off that end during the lower half of the zone as illustrated in FIGURE 7 and graph 294 of that figure. Should the vehicle speed be increased by the operator beyond the proportional control zone, arm 234 will engage spring end 252 and hold it out of contact with end 280 at all times, as indicated in FIGURE 8. The switch is therefore off throughout the oscillating cycle as shown in graph 296.

Figure 9:
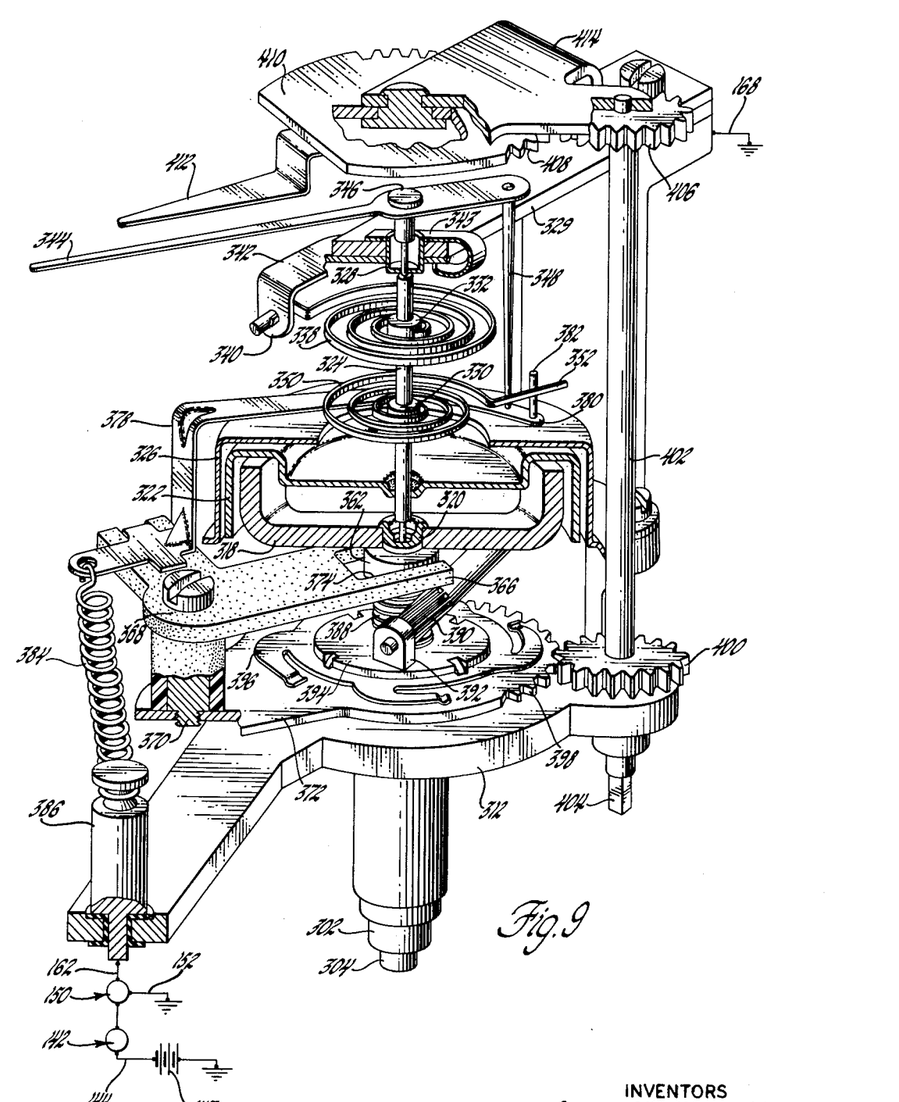
FIGURE 9 is an isometric view of a modified speed transducer assembly having the assembly integrally formed with the vehicle speedometer unit, and having parts broken away and in section.

FIGURE 9 illustrates a speed transducer unit which will sense speed in the same manner as the speed sensing unit 160. This unit provides the vehicle speedometer and the speed transducer as an integral assembly for original vehicle installation or as a replacement for the speedometer assembly originally installed. The unit drive cable is attached to the unit 300 and 302 and drives magnet drive shaft 304. The unit frame 312 is provided with suitable bearings for rotatably supporting shaft 304. A magnet 318 is secured to the inner end 320 of shaft 304 and is rotatable therewith. A speed cup 322 is mounted on a spindle 324 having one end journaled in the end 320 of shaft 304. A field plate 326 is mounted on frame 312 and extends transversely of the axis of the shaft 304. Plate 326 also provides a housing for the speed cup and magnet assembly. A bearing 328 is received in the jewel plate 329 of frame 312 for supporting the upper end of spindle 324. Spindle 324 has a contact hairspring mounting collar 330 and a speedometer hairspring collar 332 mounted thereon so that they rotate as the speed cup 322 is rotated by action of the rotating magnet 318. A speedometer hairspring 338 is torsionally wound and has its inner end secured to collar 332 and its outer end secured to the speedometer hairspring holding tab 340 formed on the hairspring regulator 342. Regulator 342 is so mounted on bearings 328 and retained against plate 329 by spring retaining clip 343 as to be rotatable thereabout to pre-tension spring 338 to provide a calibrated setting for the speedometer portion of the unit. Speedometer needle 344 is secured to the outer end 346 of spindle 324 and is rotated thereby to indicate the actual vehicle road speed. A pin 348 is secured to needle 344 and extends downwardly in parallel with spindle 324. Contact hairspring 350 has its inner end secured to collar 330 and is torsionally wound so that its outer end 352 is biased against pin 348.

An eccentric cam 362 is mounted on shaft 304 adjacent magnet 318 and is rotatably driven thereby as shaft 304 rotates. Cam follower arm 366 is journaled at one end 368 about a stud 370 which is attached to the oscillator holding plate 372. Arm 366 has a slot 374 formed therein in which eccentric cam 362 is received so that as the cam is rotated arm 366 is pivoted about stud 370. Arm 366, therefore, has one oscillating cycle per revolution of the speedometer drive when eccentric cam 362 is formed as illustrated. It may be formed so as to provide more cycles per revlution if desired. A secondary oscillator arm assembly 378 is received on the oscillatable cam follower arm 366 and extends over the field plate 326 and around the spindle 324 so that its end 380 is adjacent hairspring end 352. An oscillator electrical switching contact pin 382 mounted on arm end 380 forms a part of assembly 378 and normally engages the outer end 352 of contact hairspring 350 and cooperates therewith to provide a set of make-and-break contacts. Tension spring 384 is attached to arm 378 and to a post 386 on frame 312 to urge one side of slot 374 of cam follower arm 366 into continuous contact with cam 362.

As the unit is being driven in accordance with vehicle speed, the outer contact spring end 352 is oscillated, for example, through an arc equivalent to 10 m.p.h. vehicle speed. As contact pick-up pin 348 is rotated by spindle 324 in accordance with increasing vehicle speed, it contacts hairspring end 352 for a greater or lesser portion of the oscillating cycle to break electrical contact between hairspring 350 and contact pin 382. Hairspring 350 is electrically grounded through speed cup spindle 324. Contact pin 382 and secondary oscillator arm assembly 378 are insulated electrically from ground by oscillator arm 366 with the electrical connection for lead 162 of FIGURE 1 being made through spring 384 and post 386. Post 386 is electrically insulated from frame 312 for this purpose.

Gear 388 is secured to shaft 304 adjacent eccentric cam 362 and is rotated by that shaft. Gear 388 meshes with gear 390 to drive the odometer portion of the unit. Gear 390 is mounted at one end on bracket 392 formed on the center plate 394 of spring washer 396. This washer holds the oscillator holding plate 372 in the position to which it is rotated about shaft 304. Plate 372 is provided with a gear sector 398 meshing with a speed setting drive gear 400. The speed setting drive shaft 402 on which gear 400 is secured is journaled in frame 312 and is driven by a suitable manually controlled drive such as a flexible cable connecting with the shaft end 404. This cable is manually rotatable by the vehicle operator so that the desired speed input can be set into the unit. Another gear 406 secured to shaft 402 meshes with the gear sector 408 of the indicator plate 410 to which the pointer 412 is secured. Movement of shaft 402 therefore moves oscillator holding plate 372 and pointer 412 so that the pointer indicates the desired speed on the speedometer dial and the oscillator contact pin 382 is in the proper position for the desired speed setting. Plate 410 is rotatably mounted on the sub-jewel plate 414 for this purpose, plate 414 being a part of the frame 312.

Figure 1:
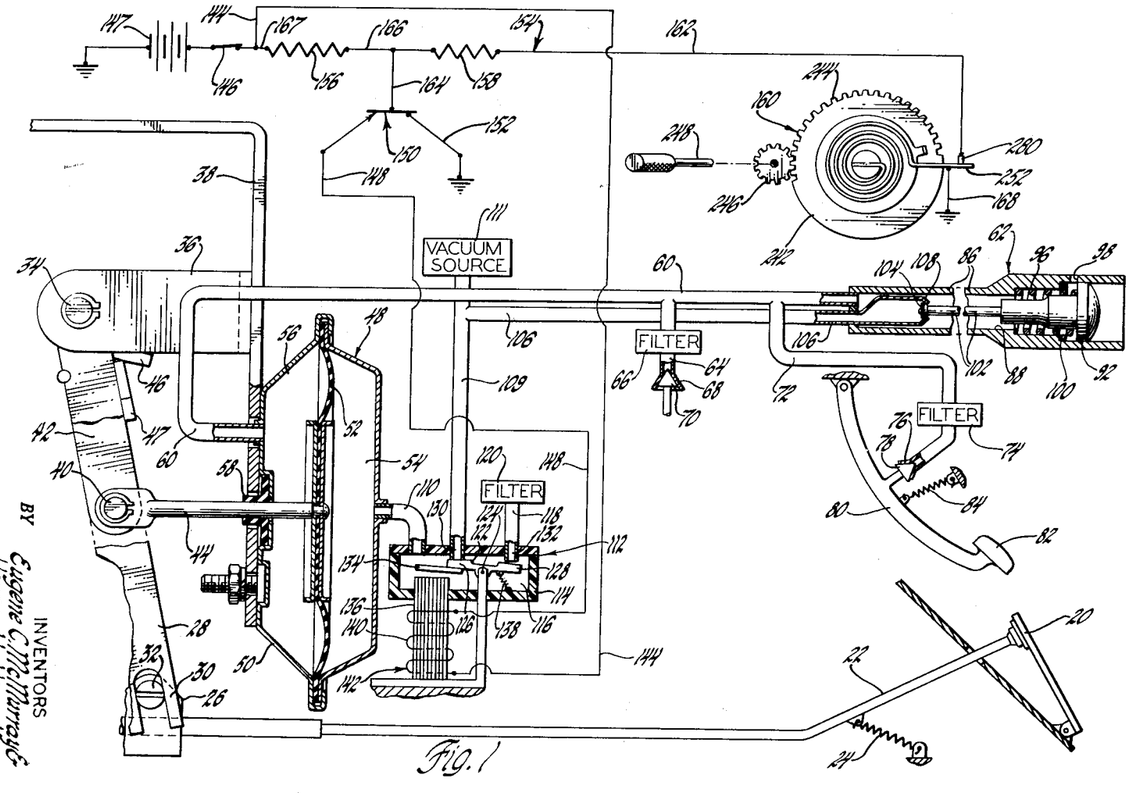
FIGURE 1 is a schematic diagram of a system utilizing a speed transducer embodying the invention and showing elements thereof broken away and in section. The system is in the speed warning mode of operation.

Lead 162 of the system of FIGURE 1 is connected with post 386 so that the circuit to contact pin 382 is completed through tension spring 384 and secondary oscillating arm 378. Frame 312 is grounded to the vehicle frame so that jewel plate 329, hairspring adjuster 342, main hairspring 338, spindle 324, and contact hairspring 350 with its contact end 352 are also connected to ground.

When the desired speed is set and indicated by the speed setting pointer 412, the mean position of the oscillating contact pin 382 will be in line with the pointer 412. As the vehicle speed increases, the speedometer needle 344 moves toward pointer 412 and the contact spring lifting pin 348 approaches contact spring end 352. When pin 348 enters the oscillating range of contact pin 382, it enters the proportional control zone and commences partial blocking of springe nd 352 so that the switch constituting spring end 352 and pin 382 is opened and closed accordingly. When the vehicle speed increases beyond the proportional control zone, the switch 352—382 is open all the time. This operation is also described in conjunction with FIGURES 5-8 and the graphs of FIG- URES 13 and 14. The strength of the main hairspring 338 is related to the torque generated by magnet 318. A relatively strong magnet may therefore be used to permit a stronger main hairspring so that the oscillating motion of the weaker contact hairspring is overcome without impairing the function of the speedometer portion of the unit.

Figure 10:
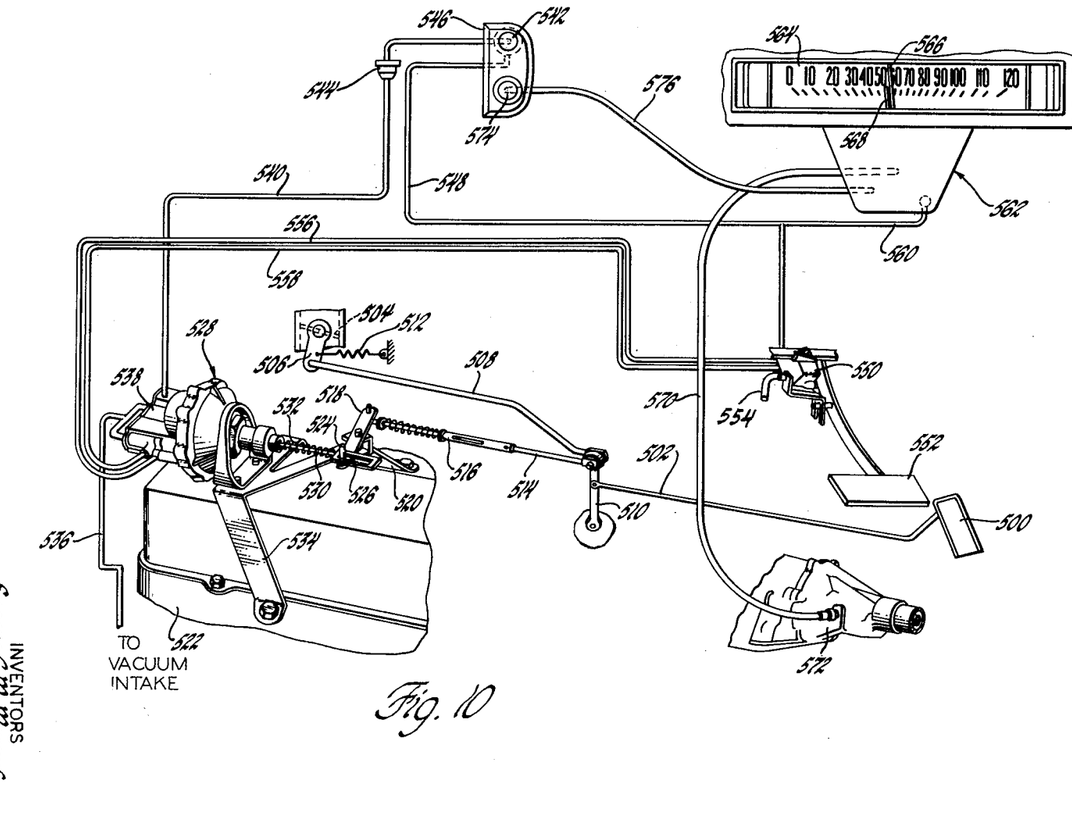
FIGURE 10 is a diagrammatic illustration of a modified speed control system utilizing an integral speed transducer and speedometer.

The modified system illustrated in FIGURE 10 utilizes an integral speedometer and speed transducer unit. It includes modified vacuum control lines connecting the brake pedal release valve and the servo mechanism for safety purposes. This system is disclosed in greater detail and claimed in U.S. patent application Serial No. 211,491, entitled "Vehicle Speed Warning and Cruise Control System With Preengagement Inhibiting Means," and filed July 23, 1962, in the names of Eugene C. McMurray and Robert C. Schniers. The accelerator pedal 500 is connected to the throttle rod 502 for a control of the engine throttle valve 504 through the intermediate throttle arm 506, rod 508 and lever 510. Throttle return spring 512 is suitably attached to the throttle linkage and urges the throttle toward the zero throttle open position. A rod 514 has a lost motion mechanism 516 incorporated therein which permits the vehicle operator to override the speed warning back pressure exerted on the throttle linkage. Lever 518 is pivotally attached to the bracket 520 mounted on a suitable part of the vehicle engine 522 and has one end of rod 514 attached to one of its ends and a pin 524 on its other end which forms a part of a lost motion mechanism 526. The control unit 528 has a servo output arm 530 terminating in a portion of closed motion mechanism 526. A compression spring 532 normally holds the end of arm 530 against pin 524. Control unit 528 is suitably mounted on engine 522 by a bracket 534 and is functionally comparable to the servo assembly 48 and speed control valve assembly 112 of the system of FIGURE 1, with these assemblies being provided in an integral unit.

A vacuum input line 536 connected to the engine intake introduces vacuum into the control unit 528 so that the proportional control speed control valve assembly portion 538 of servo unit 528 is provided with vacuum similar to the manner in which vacuum is introduced to housing 112 through conduit 109 of FIGURE 1. A speed warning line 540 connects servo unit 528 with the speed control engage button 542 through the check valve 544. Button 542 is suitably mounted in the control head 546 on the vehicle instrument panel so as to be readily accessible to the vehicle operator. When this button is pressed down, the speed warning line 540 is no longer connected with atmosphere but is instead connected to the first speed control line 548 which is connected to the brake operated release valve 550. This valve is normally closed but is open by movement of the brake pedal 552 so that atmospheric air through air intake 554 is admitted to the first speed control line 548. The second speed control line 556 is also connected to the servo unit 528 through the proportional control 538 and to the brake operated release valve 550. In addition, a safety release line 558 interconnects the proportional control 538 and the brake operated valve 550. It can, therefore, be seen that when valve 550 is open, atmospheric pressure is permitted to enter the lines 548, 556 and 558 to render the system inoperative. A branch vacuum release line 560 leading from the first speed control line 548 connects that line to the speed transducer portion of the unit 562. The operation of unit 562 is more particularly described below as a part of the description of FIGURE 11. The speedometer and speed transducer unit 562 includes a speedometer dial 564 on which the actual vehicle speed is indicated by the speedometer needle 566 and the desired speed is indicated by the pointer 568. The unit 562 is driven through the flexible cable 570 from the vehicle transmission 572 so that it receives actual vehicle speed as an input. The desired vehicle speed is set into the unit by the operator controlled knob 574, mounted in the control head 546, and the flexible cable 576.

Figure 11:
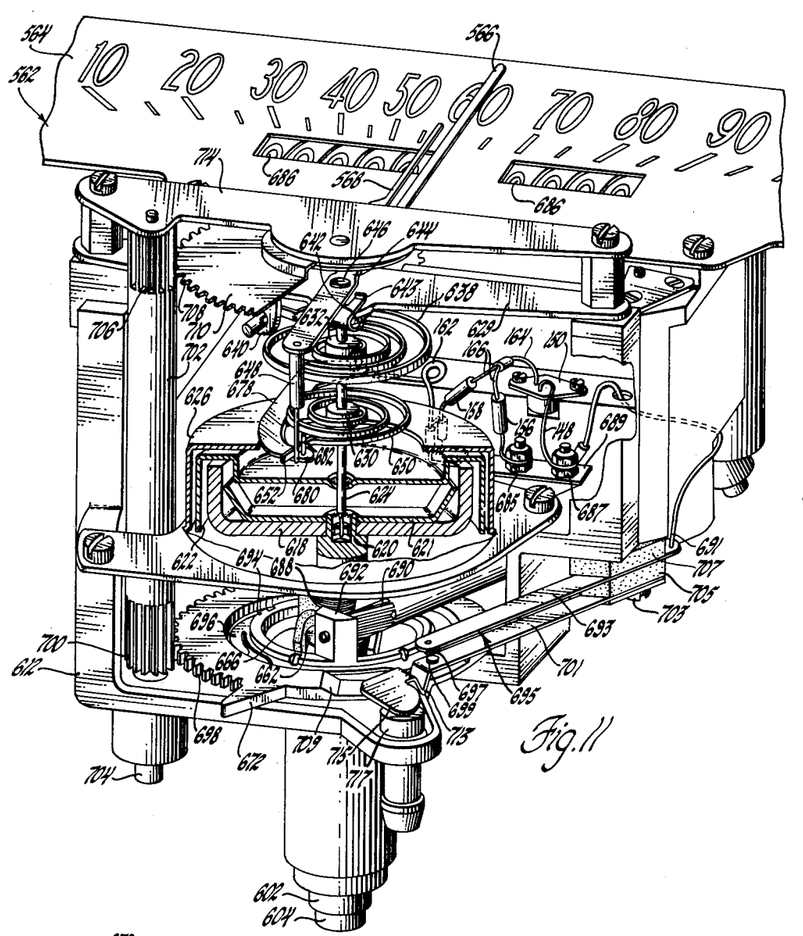
FIGURE 11 is an isometric view of another modification of a speed transducer assembly provided as an integral part of a speedometer unit, with parts broken away and in section.
Figure 12:
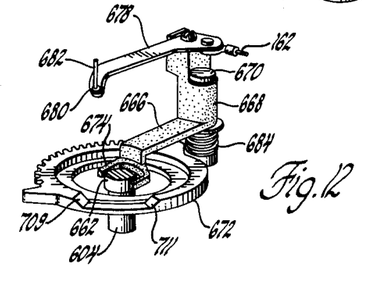
FIGURE 12 is a detail view of a portion of the mechanism of FIGURE 11.

The speedometer and speed transducer unit 562 of FIGURE 10 are illustrated in detail in FIGURES 11 and 12. The unit drive cable 570 is attached to the unit at 602 and drives the magnet drive shaft 604. The unit frame 612 is provided with suitable bearings for rotatably supporting shaft 604. A magnet 618 is secured to the inner end 620 of shaft 604 and is rotatable therewith. A temperature compensator 621 is also secured to the shaft end 620 adjacent the magnet. Speed cup 622 is mounted on a spindle 624 having one end journaled in the shaft end 620. A field plate 626 is mounted on frame 612 and extends transversely of the axis 604. Plate 626 also provides a housing for the speed cup and magnet assembly. A bearing is received in the jewel plate 629 of the frame 612 for supporting the upper end of spindle 624. A contact hairspring mounting collar 630 and a speedometer hairspring mounting collar 632 are mounted on spindle 624 so that they rotate as the speed of cup 622 is rotated by action of the rotating magnet 618. The speedometer hairspring 638 is torsionally wound and has its inner end secured to collar 632 and its outer end secured to the speedometer hairspring holding tab 640 forming a part of the speedometer hairspring regulator 642. Regulator 642 is so mounted as to be rotatable about the axis of spindle 624 to pretension spring 632 and is retained against plate 629 by the retaining clip 643. Movement of regulator 642 provides a calibrated setting for the speedometer portion of the unit. Speedometer needle 566 is secured to the outer end 646 of the spindle 624 and is rotated thereby to indicate the actual vehicle road speed on the dial 564. The end 644 of needle 566 has a pin 648 extending downwardly therefrom and parallel with spindle 624. Contact hairspring 650 has its inner end secured to the collar 630 and is torsionally wound so that its outer end 652 is biased against pin 648.

An eccentric cam 662 is mounted on shaft 604 below magnet 618 and is rotatably driven as the shaft 604 rotates. Cam follower 666 is journaled at one end 668 about a stud 670 which is attached to the oscillator holding plate 672. Arm 666 has a fork 674 formed on the other end thereof on which eccentric cam 662 is received so that as the cam 662 is rotated, arm 666 is pivoted about stud 670. Arm 666, therefore, has one oscillating cycle per revolution of the shaft 604 when the eccentric cam 662 is formed as illustrated. This cam may also be formed to provide more cycles per revolution if desired. A secondary oscillator arm assembly 678 is secured to arm 666 and extends over the field plate 626 and around the spindle 624 so that its end 680 is adjacent hairspring end 652. An oscillator electrical switching contact pin 682 mounted on arm end 680 forms a part of assembly 678 and normally engages the outer end 652 of contact hairspring 650 and cooperates therewith to provide a set of make-and-break contacts. Torsional spring 684 is wound about stud 670 and reacts against arm 666 to urge one side of fork 674 into continuous contact with contact 662.

As the unit is being driven in accordance with vehicle speed, the outer contact spring end 652 is oscillated, for example, through an arc equivalent to 10 m.p.h. vehicle speed as contact pick-up and lifting pin 648 is rotated by spindle 624. In accordance with vehicle speed, it contacts hairspring end 652 for a greater or lesser portion of the oscillating cycle to make and break electrical contact between hairspring 650 and contact pin 682. Hairspring 650 is electrically grounded through speed cup spindle 624 and contact pin 682, together with the secondary oscillator arms 678, is insulated from ground by the non-conducting characteristics of the oscillator arm 666, with the electrical connection for lead 162 being made through assembly 678. Resistor 158 is connected to transistor 150 through leads 166 and 164. Resistor 156 is also connected to lead 166 and to the terminal 685.

Lead 148 connects the transistor 150 to the terminal 687. Both terminals are mounted on the insulated terminal block 689. Lead 691 is connected to one leaf 693 of a safety shutoff switch 695 having contacts 697 and 699. Contact 699 is mounted on another leaf 701 which is grounded to the frame 612 through the screw 703. Leaves 693 and 701 are separated by insulating blocks 705 and 707 from each other and from the frame 612.

In order to shut off the entire system below or above recommended operating speeds; for example, 25 m.p.h. and 85 m.p.h., cams 709 and 711 are provided on oscillator holding plate 672 and are engageable by the cam follower 713 formed as a part of leaf 701. As the cam follower engages the holding plate intermediate the cams, the switch 695 is open. Adjustment of the plate 672 so that the follower rides up on either of the cams closes the switch 695. The closing of switch 695 will close the electromagnet operated vacuum control valve on the vacuum intake line. This valve is the same as valve 122 of FIGURE 1. In order to eliminate the speed warning effect as well as the cruise control mode of operation, the vacuum in the throttle control vacuum line 560 must be vented to atmosphere just prior to the closing of switch 695. A vacuum valve plate 715 is, therefore, provided which engages the valve seat 717 and is designed to vent vacuum line 560 by action of cam follower 713 immediately prior to the closing of switch 695.

Gear 688 is secured to shaft 604 adjacent cam 662 and is rotated by that shaft. Gear 690 meshes with gear 688 to drive odometer portions 686 of the unit. One end of gear 690 is mounted on bracket 692 formed on the center plate 694 of spring washer 696. This washer holds oscillator holding plate 672 in the position to which it is rotated about shaft 604. Gear sector 698 is provided on plate 672 and meshes with a speed setting drive gear 700. This gear is formed on shaft 702 journaled in frame 612 and is driven by the drive cable 576 connecting with the shaft end 704. Another gear 706 formed on shaft 702 meshes with the gear sector 708 of the indicator plate 710 to which pointer 568 is secured. Movement of shaft 702, therefore, moves oscillator holding plate 672 and pointer 568 so that the pointer indicates the desired speed on the speedometer dial 564 and the oscillator contact pin 682 is in the proper position for the desired speed setting. Plate 710 is rotatably mounted on sub-jewel plate 714 for this purpose. Plate 714 is secured to frame 612.

There are two modes of operation of the system available to the vehicle operator. The first mode is called the speed warning mode and is always present. The function of this mode of operation is to warn the driver when the set speed has been reached by causing the accelerator pedal of the car to resist further depression. If the driver does not desire to use this mode of operation, he may turn the speed set indicator so that it indicates a speed above that at which he intends to operate the vehicle. The driver may override the back pressure on the pedal which serves as a speed warning by exerting additional force on the pedal.

The second mode of operation is the cruise control mode. This condition is obtained by pushing the speed set button at which time the vehicle will automatically assume the preset speed and maintain it continually within the engine power output and engine braking capabilities. Operation in the cruise control mode may be discontinued by touching the brake pedal and the condition will not be reset until the speed set button is again pushed inwardly.

Figure 13:
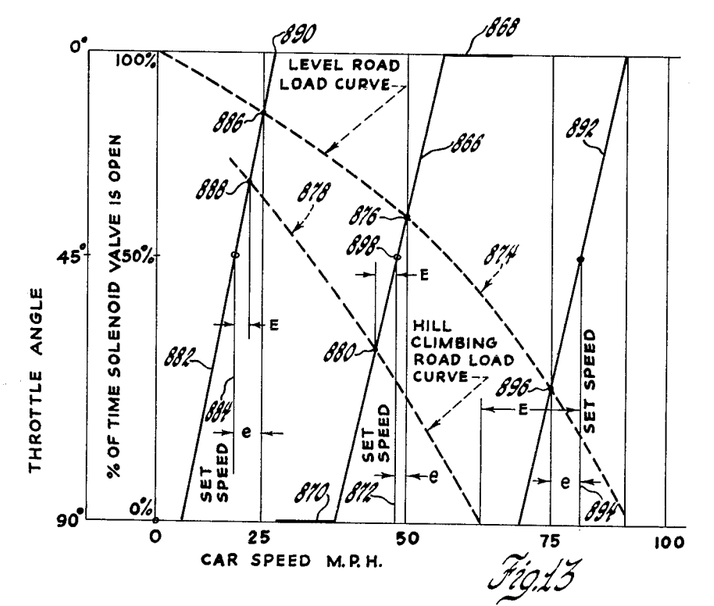
FIGURE 13 is a graph illustrating the system and speed transducer characteristics for three speed conditions.

FIGURE 13 contains several curves which graphically illustrate the system characteristics for three set speed conditions. The abscissa is graduated in miles per hour to indicate vehicle speed. Two ordinates are provided, one of them is graduated in percentages with 0% at the abscissa and increasing to 100%. This ordinate indicates the percentage of oscillating cycle time of the speed transducer that the solenoid control valve in the speed control valve assembly 112 is open. The second ordinate is degrees of throttle angle over a range of 0° to 90° with the 90° point being at the abscissa. There is a 1:1 correspondence ratio between the values on these scales.

The slanted curve 866 in the center of the graph shows zero throttle saturation at 868 and full throttle saturation at 870. It illustrates the speed range of proportional control of the system for a given manual setting of the control knob, this setting being indicated by the set speed line 872. The range of proportional control of the system is the abscissa difference between the saturation points 868 and 870. For example, we might have a 10 m.p.h. range of proportional control. The stable operating point at which we operate on a curve 866 is dependent upon the load. The upper curve 874 is a road load curve for a level road and has a stable operating point 876 where curve 874 intersects curve 866. If, however, the vehicle has a road load increase imposed, as for example, by ascending a grade, the entire road load curve moves downward indicating a requirement for a larger throttle opening angle. Curve 878 is plotted to indicate a hill climbing road load curve. A new stable operating point 880 is established and the vehicle has lost some speed. This is indicated by the fact that the abscissa of the stable operating point has changed slightly. The larger the range of proportional control, or the flatter curve 866, the more speed will be lost due to load changes. It is, therefore, advantageous to keep curve 866 as nearly vertical as possible. Under these circumstances the error produced by changing the load will also be smaller. If, however, the curve 866 is absolutely vertical so that the saturation points 868 and 870 occur at the same vehicle speed, we would be operating with on-off contactors having servos that tend to be oscillatory. Therefore, by providing a proportional control range it is possible to stabilize the entire system.

The other curves in the graph illustrate different settings of the manual set speed knob. Curve 882 illustrates the proportional control zone for a lower desired speed such as that indicated by set speed line 884. It is noted that the stable operating points 886 and 888 are nearer the zero throttle saturation point 890 than the comparable stable operating points of curve 866. Both the level road load curve 874 and the hill climbing road load curve 878 intersect curve 882 within the range of proportional control. Curve 892 is for a higher desired speed. It will be noted that the set speed indicated by line 894 is approximately 80 m.p.h. The stable operating point 896 for the level road load condition is within the range of proportional control. However, the intersecting of curve 878 with curve 892 indicates that the stable operating point under the hill climbing road load condition curve 878 is outside the range of proportional control. The throttle angle would be 90°, or fully opened. Thus, if the system were operating with a manual transmission, the vehicle would have the throttle wide open but would be unable to maintain a speed of 80 m.p.h. up a hill imposing the load indicated by curve 878. Using the system with an automatic transmission, the transmission would automatically downshift to a lower range and the vehicle would possibly negotiate the hill at 75 m.p.h. because of the downshift, if the engine were capable of producing sufficient power.

The letter $e$ indicates level road error, or the difference between the stable operating point 876, for example, and the set speed point 898 on curve 866. If, for example, the set speed is 49 m.p.h., the level road error $e$ may be about 1 m.p.h. The letter E indicates the hill climbing road load errors calculated by the vehicle speed difference between the set speed point 898 and the hill climbing stable operating point 880. Error E is on the opposite side of said speed line 872 from error $e$. In the proportional control range illustrated by curve 866, there is some one vehicle speed at which error E will be zero. At all other speeds error E will exist and its range will depend upon the range of proportional control built into the system. Proportional control range is determined by the dithering range of oscillating contact in the speed transducer. Thus, if the oscillating contact moves throughout a cycle range equivalent to 10 m.p.h. vehicle speed, the range of proportional control will be 10 m.p.h. with the cruise set speed being at the mid-point of the range.

Under normal operation the unit remains in the range of proportional control and does not operate at either saturation point. Saturation is used as a term referring to wide open throttle or fully closed throttle conditions. If the unit operates in saturation, a surging condition is obtained because there is too much gain in the system. The system is acting as a simple throttle lock, holding the throttle at either a 0° or 90° angle. If the vehicle is descending a relatively steep grade, the unit will go into zero throttle saturation and close the throttle. At the same time the vehicle may pick up speed. Under this condition the operator will have to use the vehicle brakes if the increase in speed is undesirable. This, in effect, would put a break in the curve 866, for example, and raise the saturation point 868 upwardly on the chart beyond the zero throttle position. If the vehicle is furnished with a more powerful engine, the full throttle saturation point 870 is dropped so that the vehicle may climb a steeper hill while remaining within the range of proportional control.

Figure 14:
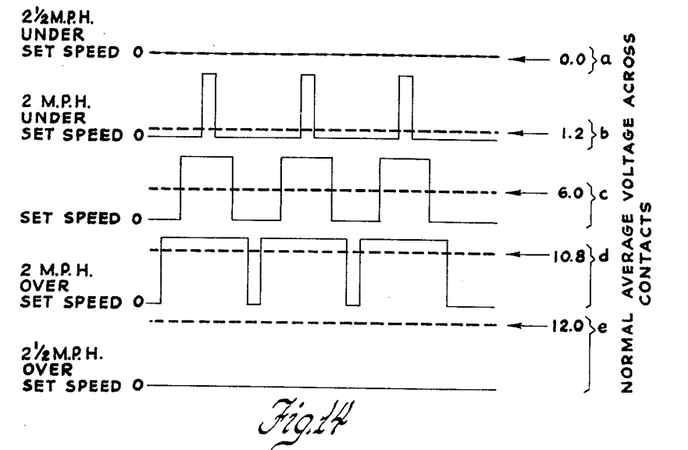
FIGURE 14 is a graph illustrating the error detection function of the speed transducer.

FIGURE 14 is a graphic illustration of the operation of the speed transducer or error detector at various points in the proportional control range. The abscissa is time, and the plot indicates the opening and closing of the contacts 252 and 280 of FIGURES 5–8 or their equivalents in the modified structures. The plot indicates normally closed contacts. As discussed above, a range of proportional control is obtained by oscillating a contact over a range of, for example, 5 m.p.h. about a median position. The median position is the set or command speed. The angular oscillation is obtained mechanically by means of an eccentric such as that shown in FIGURE 3. It has been found satisfactory to use a drive which rotates at 1,000 r.p.m., the speed at which the usual speedometer drive shaft rotates, providing an oscillation frequency of one cycle for every 5.28 feet that the vehicle travels over the road.

If the automobile is traveling more than 2½ m.p.h. below the set speed, the contacts will be closed at all times, using a 5 m.p.h. proportional control zone. If an electrical current is passed through these contacts, the voltage drop across the contacts will be zero because the contacts remain closed. This is illustrated in curve $a$ of FIGURE 14.

When the vehicle is traveling, for example, 2 m.p.h. under the set speed, the contacts will be opened during a small portion of the oscillation cycle. While they are open the voltage across the contact will be twelve volts or full battery voltage. For the remainder of the cycle the contacts are closed and the voltage across the contacts is again zero. Thus, the average voltage across the contacts over a period of time may be 1.2 volts as indicated by curve $b$ of FIGURE 14.

When the vehicle is traveling at the set speed as represented by the mid-position of the oscillating contacts, the contacts are open half the time and closed half the time. Thus, the voltage across the contacts is zero for half the time and twelve volts for half the time, producing an average voltage across the contacts over a period of time of six volts as indicated in curve $c$ of FIGURE 14.

If the vehicle is traveling 2 m.p.h. over the set speed, contacts will be opened a greater percentage of the oscillation cycle time and the average voltage level across the contact becomes 10.8 volts as indicated in curve $d$ of FIGURE 14.

If the vehicle is traveling more than 2½ m.p.h. over the set speed, the contacts will open all the time and the average voltage across them will be twelve volts. This is shown in curve $e$ of FIGURE 14.

A voltage output signal, which is the error signal for the system, is therefore provided which indicates accurately whether the vehicle is traveling below, at, or above the command speed, and the extent of error, within limits. This voltage is a proportional signal, and, in this example, zero error is represented by six volts with an underspeed condition represented by some lesser voltage and an overspeed condition represented by some greater voltage.

At the instant the contacts open several changes occur in the system in a very short time interval. Referring to FIGURE 1, and due to the inductance effect of the speed control valve coil 140, the voltage in lead 148 rises to a very high potential point. The transistor 150 is forward biased and a current flows through resistor 156. Because of the amplifying action of the transistor, a heavy current flows through the emitter-collector junction to ground, allowing the voltage in lead 148 to rise to about three volts more positive than the supply. After a finite interval of time, the energy of the inductance is dissipated and the circuit is in the "off" condition until the contacts are again closed. In the "off" situation a small current of less than .001 ampere flows through resistance 156 and transistor 150 to ground through lead 152. A small current of about .006 ampere flows through lead 148 and coil 140.

The magnetic moment required to operate armature 134 is a function of the pneumatic and spring moments, the amount and type of metal in the flux return path, and the air gap opening. For approximately equal response time in each direction of operation, the amount of energy available from the magnetic flux circuit should be approximately twice that energy stored in spring 138. The energy in the flux is produced from current flowing through the electromagnet and producing an electromagnetic force. This force is proportional to the coil voltage times core flux times coil turns divided by coil resistance and is inversely proportional to armature air gap travel. Thus, the proportional signal developed by the speed transducer operates to provide the cycling pressure which moves the diaphragm 52 of the unit to control the engine throttle and either provide a warning at the set speed or to maintain the vehicle at the set speed.

Stability of operation of the system is introduced into the power unit 48 when the system is operating in the cruise control mode by opposing the raw engine vacuum in chamber 56 with a differential pressure in chamber 54 which has raw engine vacuum as one of those components. The relatively high variations in raw engine vacuum, therefore, partially cancels itself. This feature of the system also partially compensates for variations in atmospheric pressure when the system is employed at different geographical elevations. While the compensation is not complete, it is sufficient to provide satisfactory speed control operations at all elevations normally encountered. The overall effect is to control speed at, for example, 50 m.p.h. at sea level and, with the same setting, to maintain speed of about 48 m.p.h. at an altitude of several thousand feet above sea level.

We claim:
1. Mechanism for sensing actual speed of an element and comparing the sensed speed with a desired element speed and developing a speed error signal, said mechanism comprising a speed cup, drive means for said speed cup driven in proportion to actual element speed, a first electrical contact driven by said speed cup, a second electrical contact center-positioned relative to said first contact at a desired element speed, oscillating linkage connected to said second contact and driven by said speed cup driving means to oscillate said second contact throughout a proportional speed zone, said first and second contacts being engageable and disengageable in said zone for varying time periods proportional to the difference between the sensed element speed and the set element speed, and an electrical circuit controlled by said first and second contacts and including a signal amplifier for amplifying the proportional speed error signal generated in said circuit.

2. The system of claim 1, said signal amplifier being an on-off twitch-type transistor.

3. In a speed transducer, speed sensing means having an arcuate movement proportional to the sensed speed, proportional speed zone setting means establishing a proportional speed zone through which said speed sensing means is movable, and cyclically oscillatable means engageable by said speed sensing means in the proportional speed zone for varying periods of time per oscillation of said oscillatable means in relation to the position of said sensing means in said proportional speed zone.

4. A speed error signal generator comprising, a speed indicator responsive to a sensed speed, desired speed setting means, speed error proportional control zone establishing means for establishing a proportional control zone on either side of the desired speed set by said setting means through which said indicator is movable cyclically oscillatable means for engaging said indicator in said zone during each oscillatory period of said oscilaltable means in time-duration relation to the speed error determined by the difference between the sensed speed and the desired speed setting, and means for developing a speed error signal proportional to the engagement time-duration relation.

5. The speed error signal generator of claim 4, said engagement time-duration increasing with a decrease in speed error when the sensed speed is on one side of the desired speed setting and increasing with an increase in speed error when the sensed speed is on the other side of the desired speed setting.

6. Speed error sensing means comprising, a drive member, a speed indicator indicating the actual speed of said drive member by arcuate movement, desired speed setting means for setting a speed value with which the speed of said drive member is compared to obtain speed error, and means cyclically oscillated by said drive member throughout an arcuate range of speed indication on either side of the desired speed setting and engaging said speed indicator when the speed of said drive member is within the speed indication range of oscillation for varying portions of the oscillator cycle, the relative time of engagement and disengagement of said oscillated means with said speed indicator during each oscillating cycle reflecting speed error.

7. A speed transducer comprising a frame, a drive shaft rotatably journaled in said frame and having a magnet and an eccentric cam drivingly secured thereto, a speed cup and a speed cup spindle driven by said magnet, speed indicating means secured to and driven by said spindle and indicating actual speed of said drive shaft, means for setting a desired drive shaft speed, a cam follower pivotly mounted on said desired speed setting means and engaging said cam and oscillated by said cam as said cam is rotated by said drive shaft, a contact pin operatively mounted on said cam follower to oscillate therewith, a contact hairspring secured to said spindle and having an end in engageable relation with said contact pin, a contact pick-up pin on said speed indicating means and movable therewith in engageable relation with said contact hairspring end, and a speed signal electric circuit controlled by contact of said contact pin and said contact hairspring for a portion of the cam follower oscillating cycle in accordance with the difference between the speed indicated by said speed indicating means and the set desired speed.

8. The speed transducer of claim 7 further having means for driving said desired speed setting means and a desired speed indicator, said desired indicator being in juxtaposed relation with said speed indicating means.

9. A speed transducer for indicating an actual speed and a desired speed and developing a speed error signal, said transducer comprising, a drive shaft having an eccentric cam thereon, magnetically driven speed indicating means driven by said shaft and including a spindle and an indicating arm and a hairspring movable by said spindle and said arm, desired speed indicating and setting means including a setting shaft, a first driven plate and indicating arm movable by said setting shaft to indicate the desired speed setting, a second driven plate driven by said setting shaft and having an oscillating arm mounted thereon and a contact pin secured to said oscillating arm in engageable relation with said hairspring, said oscillating arm being mounted to be oscillated by said eccentric cam over a speed control range containing the set desired speed, said hairspring and said contact pin remaining in engagement below said speed ranges and having make-and-break engagement in said control range and remaining disengaged above said control range by movement of said indicating arm and said hairspring in response to actual shaft speed, and an electrical circuit controlled by switch means including said hairspring and said contact pin and sensitive to the time of engagement and disengagement thereof to develop a speed error signal.

10. The speed transducer of claim 9, said circuit having another switch means therein and said second driven plate having cam means for opening said switch below one predetermined set speed and above another predetermined set speed and closing said switch intermediate said predetermined set speeds to render said circuit operation only when the desired set speed is intermediate the predetermined set speeds.

11. Speed error sensing mechanism having a first contact movable in direct relation to a sensed speed, a second contact having desired speed setting means moving said second contact to a setting corresponding with a desired speed, means oscillating said second contact over a speed range including said desired speed, said second contact engaging said first contact when said sensed speed is less than said desired speed, said second contact being disengaged from said first contact when said sensed speed is greater than said desired speed, said first and second contacts thereby having an engaged and disengaged relation within said speed range proportional to the speed error of the sensed speed to the desired speed.

12. In a speed transducer for a rotatable driven element, element speed sensing means having an arcuate movement proportional to the sensed element speed, proportional speed zone setting means establishing a proportional speed zone through which said speed sensing means is movable, oscillatable means drivable by said driven element to oscillate cyclically in direct relation to the rotation of said driven element, and means moutned on said oscillatable means engageable by said speed sensing means in the proportional speed zone for varying portions of each oscillatory cycle in relation to the position of said sensing means in said proportional speed zone.

References Cited in the file of this patent
UNITED STATES PATENTS

| | | |
|---|---|---|
| 1,990,354 | Sylvester et al. | Feb. 5, 1935 |
| 2,822,881 | Treharne | Feb. 11, 1958 |